3,309,664
VEHICLE AUTOMATIC DOOR LOCK AND INDICATOR DEVICE
Walter E. Deutsch, 1421 Veteran Ave., Los Angeles, Calif. 90024, and Renee H. Sanders, 2916 Oakhurst Ave., Los Angeles, Calif. 90034
Filed May 28, 1964, Ser. No. 370,919
6 Claims. (Cl. 340—56)

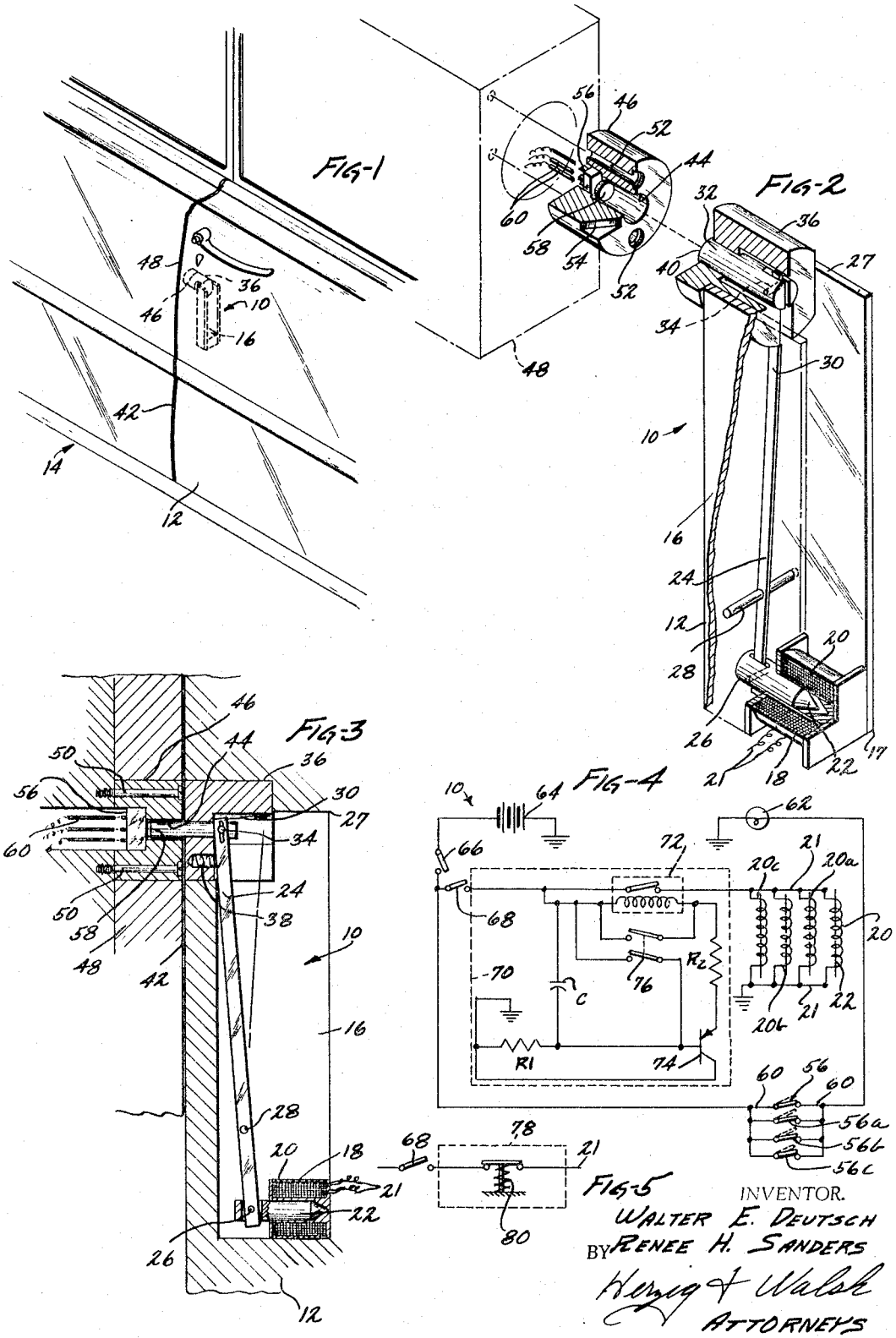

This invention relates to an automobile door lock, and more particularly to an electrically operated safety lock which automatically locks each door of an automobile when its ignition switch is turned on.

Although manual safety locks and electric door locks are known for automobile doors, they do have certain disadvantages.

Some manual locks are automatically released when the front doors of a car are opened. This has the disadvantage that youngsters may open the rear doors of a car without the knowledge of the driver, should his door be open at the time. Another disadvantage resides in the fact that there is no visual warning when a door is not fully closed and locked.

Another disadvantage with other manual locks resides in the fact that the rear doors of the car cannot be opened unless the front doors are first opened to release the locks on the rear doors.

Yet another disadvantage with prior art manual locks resides in the fact that most of them do not lock the front doors of the automobile on which they are used.

A disadvantage with certain prior art electric door locks resides in the fact that children can open the rear doors of an automobile from the inside even though the locks may be energized.

Another disadvantage with prior art electric locks resides in the fact that most of them do not provide a separate, sliding-bolt type of lock for all of the doors, but usually rely upon the conventional door lock.

In view of the foregoing factors and conditions characteristic of automobile door locks, it is a primary object of the present invention to provide a new and useful door lock not subject to the disadvantages enumerated above and having sliding bolts which are held closed when an electric circuit is energized and which are released automatically when the circuit is deenergized.

Another object of the present invention is to provide an automobile door safety lock of the type described which may be mounted within the frame and door of an automobile safely, efficiently and expeditiously.

Yet another object of the present invention is to provide an automobile door safety lock of the type described which prevents children from opening the automobile doors without the knowledge and assistance of the driver of the automobile.

Another object of the present invention is to provide an automobile door safety lock with a visual warning light which is activated when the doors are not fully closed and locked.

A further object of the present invention is to provide an automobile door lock of the type described which employs sliding bolts for each door thereby minimizing the chances of the doors springing open when the automobile is involved in an accident.

A still further object of the present invention is to provide an automobile door lock of the type described which is wired through the automobile ignition switch and which includes a time delay switch so that the doors may be temporarily opened without turning off the ignition switch.

According to the present invention, a sliding-bolt type safety lock is mounted in each door of an automobile and is engageable with a block mounted in the automobile frame. The bolts are spring-biased to an unlocked position and are automatically locked by an electric solenoid which is energized when the automobile ignition switch is turned on.

A warning light is wired in the circuit with the ignition switch and the sliding bolts in such a manner that the warning light remains lit as long as at least one of the sliding bolts is not properly seated in its associated block. A cut-off switch is provided in the circuit so that the safety lock may be deenergized even though the ignition switch is turned on. Also, a time-delay switch is provided in the circuit so that the doors can be opened temporarily without affecting the over-all operation of the device.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:

FIGURE 1 is a diagrammatic view of an automobile door showing, in broken lines, an automobile safety lock of the present invention is association therewith;

FIGURE 2 is an enlarged, exploded perspective view of the door lock of FIGURE 1;

FIGURE 3 is an enlarged cross-sectional view of the door lock of FIGURE 1 showing the lock in a locked position;

FIGURE 4 is a wiring diagram of the circuit employed to actuate the door lock of FIGURE 1; and FIGURE 5 is a wiring diagram showing a modification of the circuit of FIGURE 4.

Referring again to the drawings, an automobile door safety lock constituting a presently preferred embodiment of the invention, generally designated 10, may be mounted in each door 12 of an automobile generally designated by the numeral 14. Although but a single automobile door and associated door lock will be shown and described for purposes of illustration, but not of limitation, it is to be understood that in actual practice, a door lock of the present invention will be employed in connection with each door of a particular automobile.

The door lock 10 includes a housing or channel 16 in one end 17 of which a solenoid 18 is mounted. The solenoid 18 includes a coil 20 having electrical leads 21 and a core or plunger 22. A lever 24 is pivotally connected to the plunger 22 by a pin 26 and extends to the other end 27 of the channel 16. The lever 24 is pivotally connected intermediate its ends to the channel 16 by a pin 28 and has its end 30, which is remote from the plunger 22, pivotally connected to a slide-bolt 32 by a pin 34.

The bolt 32 is slidably mounted in a housing 36 in such a manner that counterclockwise pivoting of the lever 24 (as viewed in FIGURE 2) causes the bolt 32 to protrude from the housing 36 and clockwise pivoting of the lever 24 causes the bolt 32 to be retracted into the housing 36. A spring 38 (FIGURE 3) normally biases the bolt 32 into its retracted position. The housing 36 is rigidly affixed to the upper end 27 of the channel 16. The assembly comprising the channel 16, the solenoid 18 and the housing 36 is mounted inside the car door 12 in such a manner that the end 40 of the bolt 32 extends beyond the rear edge 42 of door 12 when the bolt 32 is extended into a bore 44 provided in a cylindrical block 46. The block 46 may be mounted in the door jamb or post 48 of automobile 14 by bolts 50 which pass through bores 52 provided in block 46. The block 46 is provided with a beveled surface 54 which serves as a striker plate for the bolt 32 should the door 12 be closed while the bolt 32 is in its extended position.

A normally closed electrical switch 56 is mounted in the bore 44 of block 46 and includes a button 58 which is engageable by the end 40 of bolt 32 to open switch 56 when the bolt 32 is extended into the bore 44 to lock the door 12. Electrical leads 60 connect the normally closed switch 56 in an electrical circuit to be hereinafter described to control an indicator lamp 62 (FIGURE 4) which indicates whether or not the bolt 32 is properly seated in the bore 44.

Referring now to FIGURE 4, the coil 20 of the solenoid 18 and the coils 20a, 20b and 20c forming part of locks which may be identical with the lock 10 and used in the other doors, not shown, of automobile 14, receive electrical power from the battery 64 of automobile 14 through its ignition switch 66, a master switch 68 and a time-delay switch 70.

The normally closed switch 56, together with switches 56a, 56b and 56c, for other door locks, not shown, are also connected to the battery 64 through the ignition switch 66 to control the operation of the indicator lamp 62. When the ignition switch 66 is turned on, the lamp 62 will light and remain lit until the sliding bolts for all of the door locks are in engagement with their associated switches 56, 56a, 56b and 56c.

The time-delay switch 70 may be opened to de-energize the coils 20, 20a, 20b and 20c so that the doors of the automobile 14 may be opened temporarily even though the ignition switch 66 remains on. At the end of a predetermined interval of time, the time-delay switch 70 closes to re-energize the coils automatically locking the doors again. The time-delay switch 70 includes a relay 72, a pair of resistors $R_1$ and $R_2$, a capacitor C, a transistor 74 and a momentary switch 76. Relay 72 is normally closed when the ignition switch is on. Manual closing of the contacts of momentary switch 76 shunts the winding of relay 72 causing it to open de-energizing the coils 20. The other contact of switch 76 shunts condenser C which discharges through resistor $R_1$, this condenser normally being charged when ignition switch 66 is closed. Switch 76 having been momentarily closed reopens and condenser C recharges, this condenser and resistor $R_1$ forming a time delay circuit. Capacitor C controls the bias on the base of transistor 74. At the end of the time delay when capacitor C is charged, transistor 74 conducts and relay 72 is again re-energized through resistor $R_2$ and transistor 74, and the coils 20 are re-energized.

The master switch 68 may be opened manually to break the circuit to the coils 20, 20a, 20b and 20c even though the ignition switch 66 is on. This is sometimes convenient when parking the car in a supervised parking lot where the attendants frequently move the vehicle 14 about the parking lot.

Alternatively, the time-delay switch 70 may be dispensed with and a momentary delay switch of the type shown schematically in FIGURE 5 may be employed in place thereof by connecting it to the switch 68 and the lead 21 for the coil 20c. The switch 78 is normally closed by a spring 80 and serves to temporarily take the door locks out of operation by de-energizing their coils when the switch 78 is opened. The spring 80 automatically closes the switch 78 when it is released.

While the particular automobile door safety lock herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. In an automobile having an electrical system, an ignition switch, a door and a door jamb, the combination comprising: bolt means slidably mounted in said door for engagement with said jamb; solenoid means connected to said bolt means for sliding said bolt means into engagement with said jamb to lock said door when said solenoid means is energized; electrical leads connecting said solenoid in said electrical system through said ignition switch, a normally closed electrical switch mounted in said jamb for engagement by said bolt means, an indicator lamp connected to said normally closed switch, said normally closed switch being connected to said automobile electrical system through said ignition switch, whereby said indicator lamp becomes lit when said ignition switch is closed and remains lit until said bolt means engages said normally closed switch to open it.

2. In an automobile having an electrical system, an ignition switch, a door and a door jamb, the combination comprising: bolt means slidably mounted in said door for engagement with said jamb; solenoid means connected to said bolt means for sliding said bolt means into engagement with said jamb to lock said door when said solenoid means is energized; electrical leads connecting said solenoid in said electrical system through said ignition switch; and a time delay switch connected to said solenoid means for re-energizing said solenoid means at a predetermined time after it has been de-energized by opening said time delay switch.

3. In an automobile having an electrical system, an ignition switch, a door and a door jamb, the combination comprising: bolt means slidably mounted in said door for engagement with said jamb; solenoid means connected to said bolt means for sliding said bolt means into engagement with said jamb to lock said door when said solenoid means is energized; electrical leads connecting said solenoid in said electrical system through said ignition switch, and a normally closed spring loaded switch connected to de-energize said solenoid means when open and to automatically return to closed position for re-energizing the solenoid means when released.

4. In combination with an automobile having an electrical system, an ignition switch, a door and a door jamb, a safety lock comprising, bolt means slidably mounted in said door for engagement with said jamb, energizable means connected to said bolt means for sliding said bolt means into engagement with said jamb to lock said door when said energizable means is energized, a source of energy connected to said energizable means for energization thereof, the energizable means being energizable by the ignition switch, and additional switch means controlling said energizable means, the additional switch means comprising means for temporarily de-energizing said energizable means and again re-energizing said means after a predetermined time delay.

5. A combination as in claim 4 wherein said additional means comprises a manual switch for bringing about de-energization of said energizable means and time delay means for automatically re-energizing said energizable means after a predetermined time.

6. A combination as in claim 4 including an indicator light and switch means operable by said bolt means to cause said indicator light to be on whenever said bolt is out of locking position.

References Cited by the Examiner
UNITED STATES PATENTS
2,674,334   4/1954   Uberbacher _____ 340—52 X NEIL C. READ, Primary Examiner.

A. H. WARING, Assistant Examiner.